US009462018B2

(12) United States Patent
Setton et al.

(10) Patent No.: US 9,462,018 B2
(45) Date of Patent: Oct. 4, 2016

(54) MULTIWAY PEER-TO-PEER MEDIA STREAMING (75) Inventors: Eric E. Setton, Palo Alto, CA (US); Siddhartha Annapureddy, Palo Alto, CA (US); John Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 12/812,170

(22) PCT Filed: Jan. 10, 2008

(86) PCT No.: PCT/US2008/050729
§ 371 (c)(1),
(2), (4) Date: Jul. 8, 2010

(87) PCT Pub. No.: WO2009/088513
PCT Pub. Date: Jul. 16, 2009

(65) Prior Publication Data
US 2010/0287238 A1 Nov. 11, 2010

(51) Int. Cl.
G06F 15/16 (2006.01)
H04L 29/06 (2006.01)
H04N 21/4788 (2011.01)
H04L 29/08 (2006.01)

(52) U.S. Cl.
CPC ......... H04L 65/4084 (2013.01); H04L 65/103 (2013.01); H04L 65/605 (2013.01); H04L 67/104 (2013.01); H04L 67/1046 (2013.01); H04L 67/1059 (2013.01); H04N 21/4788 (2013.01)

(58) Field of Classification Search
CPC ............ H04N 21/4788; H04L 65/605; H04L 65/4084; H04L 67/1059; H04L 67/104; H04L 67/1046; H04L 65/103

USPC ................................ 709/201, 204–205, 231
See application file for complete search history.

(56) References Cited

U.S. PATENT DOCUMENTS 7,945,694 B2 * 5/2011 Luzzatti ............ H04L 29/06027
709/201
2002/0147771 A1 * 10/2002 Traversat et al. ............. 709/203
(Continued)

FOREIGN PATENT DOCUMENTS

CN      1909509 A        2/2007
JP      2006-268844      10/2006
WO      WO2007110865 A1  10/2007

OTHER PUBLICATIONS

European Supplementary Search Report dated Apr. 4, 2013; issued in related EP appl 08727530.1, 5 pages.
(Continued)

*Primary Examiner* — Abdullahi E Salad
(74) *Attorney, Agent, or Firm* — Wagner, Murabito & Hao (57) ABSTRACT Multiway peer-to-peer media streaming is disclosed. In one embodiment, a method comprises defining a first portion of a peer-to-peer network. The method then recites defining a second portion of the peer-to-peer network. The present method then utilizes the first portion of the peer-to-peer network to generate an aggregated media stream, wherein the aggregated media stream is comprised of a plurality of media streams. The present method then delivers the aggregated media stream from the first portion of the peer-to-peer network to the second portion of the peer-to-peer network.

23 Claims, 4 Drawing Sheets

(56) References Cited

U.S. PATENT DOCUMENTS

| | | | |
|---|---|---|---|
| 2003/0009570 A1* | 1/2003 | Moskowitz et al. | 709/229 |
| 2004/0194143 A1* | 9/2004 | Hirose | 725/97 |
| 2005/0188085 A1* | 8/2005 | Lin et al. | 709/225 |
| 2005/0223102 A1* | 10/2005 | Zhang et al. | 709/228 |
| 2006/0187876 A1 | 8/2006 | Schmidle et al. | |
| 2008/0209491 A1* | 8/2008 | Hasek | 725/114 |
| 2008/0288580 A1* | 11/2008 | Wang et al. | 709/203 |
| 2009/0248872 A1* | 10/2009 | Luzzatti | H04L 29/06027 709/226 |
| 2010/0011103 A1* | 1/2010 | Luzzatti | H04L 29/06027 709/226 |

OTHER PUBLICATIONS

Jose M Sanchez Santana, et al; "UPNP Service Discovery for Heterogeneous Networks"; The 17th Annual IEEE International Symposium on Personal, Indoor and Mobile Radio Communications (PIMRC'06); 1-4244-0330-8/06/$20.00_c 2006 IEEE.

* cited by examiner

MULTIWAY PEER-TO-PEER MEDIA STREAMING

FIELD

Various embodiments of the present invention relate to the field of streaming media.

BACKGROUND

Peer-to-peer networks are computer networks that rely on the distributed bandwidth of participant clients, referred to as "peers," for transmitting data. For instance, peer-to-peer networks are used for sharing data and for streaming media data. Media streaming to a large audience may be achieved by using a peer-to-peer network, where peers act both as receivers and as relays for the stream. Peer-to-peer networks provide the benefit of distributing the throughput over a large number of peer devices.

No video communication tool today is flexible enough to support a panel discussion between several distributed speakers addressing a distributed audience, over a network such as the Internet, at a low cost.

Additionally, such a system should maintain very low latency communication between the different speakers to enable them to converse naturally, and present the audience with a synchronized multiplexed stream at a high enough quality to create a good viewing experience. Existing systems rely on costly and cumbersome dedicated infrastructure to create this viewing experience. Typically, speakers would be located in dedicated rooms, a centralized location would multiplex the different streams, and/or servers would provide the multicast to remote viewers.

Two types of conventional systems include video web-conferencing and video multicasting. In some conventional video web-conferencing systems, a two-way video session can be opened between two clients offering low delay communication. Although some of these conventional solutions use a peer-to-peer network to communicate video when two clients only are running, such conventional solutions cannot utilize a peer-to-peer network when the number of users increases beyond two. In the area of business video web-conferencing, several systems provide customers with the ability to participate in remote multi-way web-conferencing. These systems, however, rely on a dedicated infrastructure and their architecture is different (either server-driven star-shaped distribution or point-to-point architecture).

Regarding video multicasting, in the last two decades much work has considered media delivery from a single server or from a set of servers to a set of clients. One-to-many commercial streaming solutions are offered via content delivery networks (CDNs). Such approaches are based on an overlay of replication or minor servers, to which users are redirected when the maximum number of streams of an individual media server (typically between a few hundred and a few thousand) is exceeded. CDNs are star-shaped distribution systems which relay a one-way stream to an audience of viewers and such architectures differ significantly from peer-to-peer architectures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DESCRIPTION OF EMBODIMENTS

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

As an overview, various embodiments of the present invention provide peer-to-peer media streaming. Although the embodiments of the present invention are described with respect to the streaming of video data, it should be understood that embodiments of the present invention are not limited to the streaming of video data. It should be appreciated that embodiments of the present invention also apply to other types of media, including without limitation: audio-based data, image-based data, graphics data, video-based data, text-based data, web page-based data, and the like. Moreover, it should be appreciated that embodiments of the present invention can also be applied to on-demand transmission, including synchronous (e.g., live), asynchronous (e.g., time-shifted), or downloaded transmissions. In embodiments in accordance with the present invention, a peer-to peer network is defined to have at least two portions. The first portion of the peer-to-peer network is comprised of active sources, and the second portion of the peer-to-peer network is comprised of relay/receivers. In embodiments in accordance with the present invention, the active sources aggregate the media streams using a peer-to-peer data-driven streaming protocol. The aggregated stream is transmitted to all the relay/receiver peers via application layer multicast tree(s). The roots of the tree are chosen among the active sources. A registration server maintains a list of the number of active sources and of their internet protocol (IP) addresses. Typically, the active source portion of the peer-to-peer network is limited to a small subgroup of peers whose constraints (e.g. delay requirements) are most stringent. The relay/receiver portion of the peer-to-peer network is comprised of peers who do not suffer from stringent constraints. In so doing, embodiments in accordance with the present invention provide a real-time multi-way video communication protocol based on peer-to-peer technologies. Embodiments in accordance with the present invention enable, for example, a panel discussion between several distributed speakers addressing a distributed audience, over a network such as the Internet, at low cost, and in a scalable fashion. There are a variety of events and communities where a large number of people at distributed geographical locations may want to interact. Examples include a panel discussion, lecture, town hall meeting, community event, religious ceremony, or presidential debate. In these examples, typically only a small fraction of the large number of participants are active at any point in time, while the others are observing (in some cases the roles may change over time). Additionally, embodiments in accordance with the present invention are able to use different peer-to-peer multicast networks and protocols to transmit the different media streams to the peers and accommodate the peers' different quality of service or delay constraints.

Figure 1:
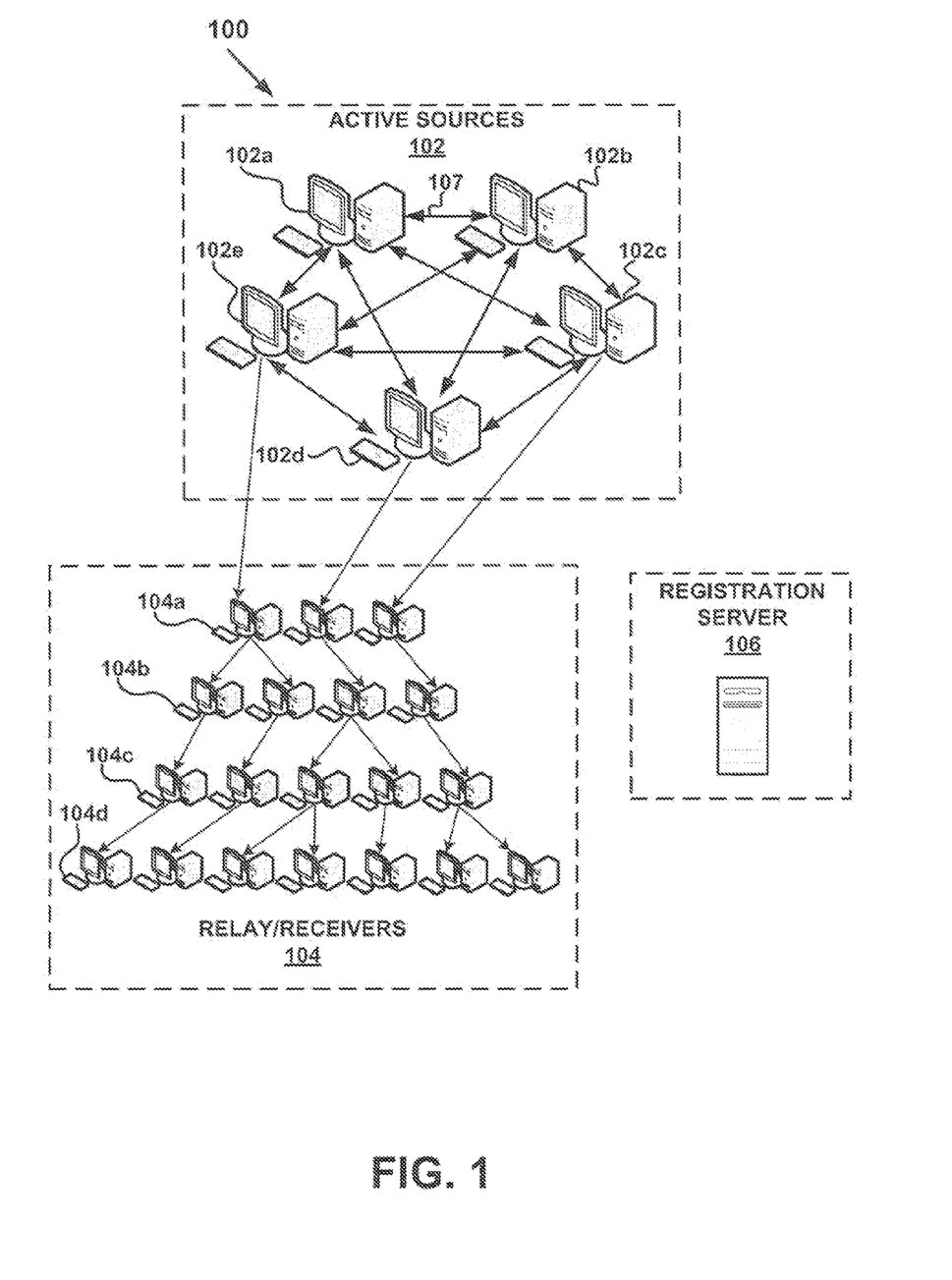
FIG. 1 is a schematic diagram of a peer-to-peer network configuration for media streaming in accordance with one embodiment of the present invention.

Referring now to FIG. 1, a schematic diagram of a peer-to-peer network configuration 100 for media streaming in accordance with the present invention is shown. In order to clearly describe embodiments in accordance with the present invention, FIG. 1 will be described in conjunction with FIG. 2 which is a flowchart 200 illustrating a process for peer-to-peer media streaming in accordance with embodiments of the present invention. As illustrated in FIG. 1, in embodiments in accordance with the present invention, the peer-to-peer network configuration is comprised of three parts: active sources 102 (typically shown as 102a, 102b, 102c, 102d, and 102e), relay/receivers 104 (typically shown as 104a, 104b, 104c, and 104d), and a registration server 106.

Figure 2:
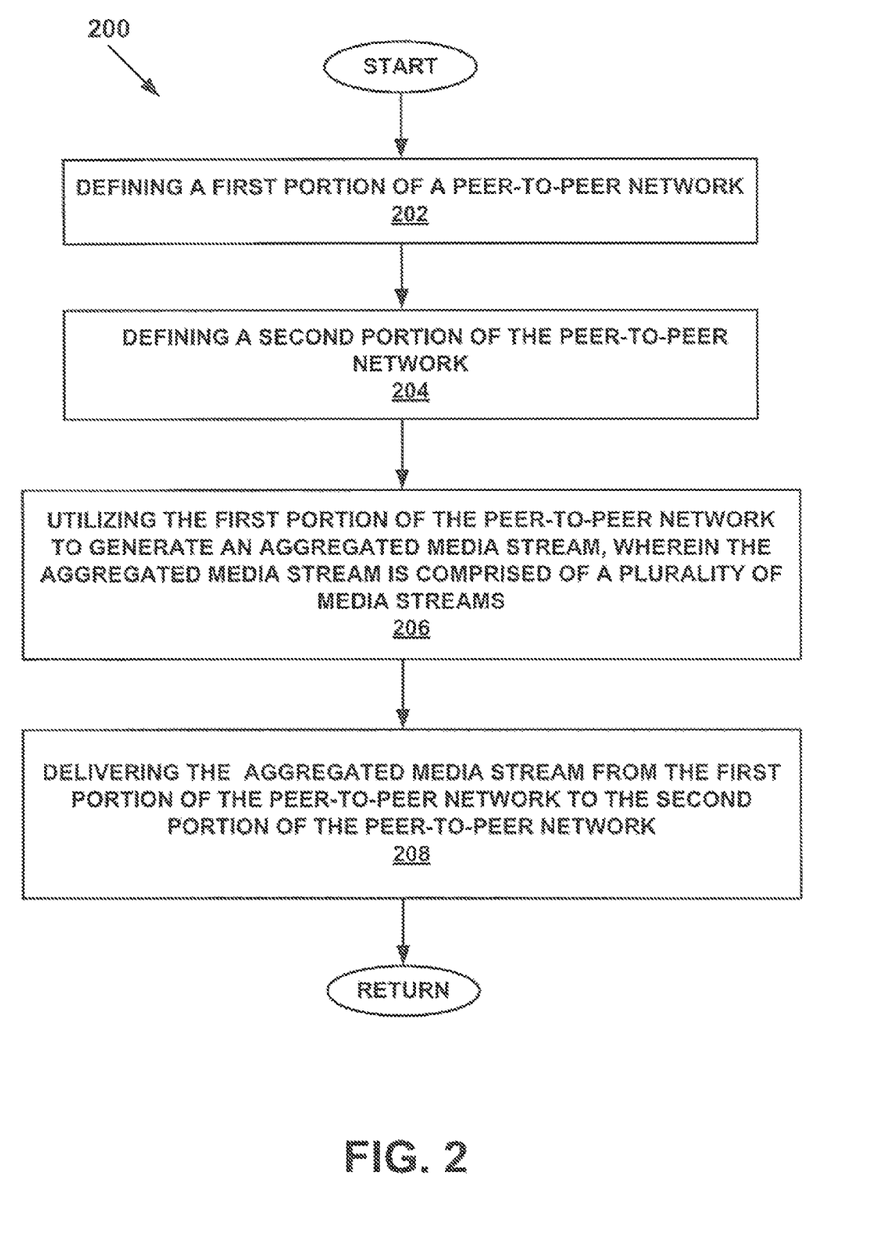
FIG. 2 is a flowchart illustrating a process for peer-to-peer media streaming in accordance with one embodiment of the present invention.

Referring still to FIG. 1, and also to 202 and 204 of FIG. 2, embodiments in accordance with the present invention define a peer-to-peer network as being comprised of at least two portions. In the embodiment depicted in FIG. 1, the peer-to-peer network is comprised of a first portion comprised of active sources 102 and a second portion comprised of relay/receivers 104. That is, as shown at 202 of FIG. 2, embodiments in accordance with the present invention define a first portion of a peer-to-peer network. At 204 of FIG. 2, embodiments in accordance with the present invention define a second portion of a peer-to-peer network. Specifically, embodiments in accordance with the present invention define those peers which generate content (e.g., a video stream, an audio stream, etc.) as active sources (i.e., the first portion of the peer-to-peer network). Hence, embodiments in accordance with the present invention hierarchically define a peer-to-peer network to include at least a first portion and a second portion.

Additionally, embodiments in accordance with the present invention also define constraint-burdened peers as active sources (i.e., the first portion of the peer-to-peer network). As an example, a listener to a teleconference who does not wish to speak (i.e., generate content), but who wishes to be ensured prompt delivery of generated content, can indicate a preference to be defined as an active source. In such an example, even though the peer is not generating content, the peer is still defined as an active source and, as such, receives generated content without considerable delay. In one embodiment, active sources 102 transmit content between each other at near-real time. In one embodiment in accordance with the present invention, the peer is offered the opportunity to be defined as an active source (regardless of whether or not the peer is expected to generate content) for an additional monetary cost, for example.

As will be discussed in greater detail below, embodiments in accordance with the present invention define those peers who do not suffer from stringent constraints as relay/receivers (i.e., the second portion of the peer-to-peer network). Similarly, embodiments in accordance with the present invention define those peers who do not generate content as being members of the second portion (i.e., relay/receivers 104) of the peer-to-peer network. Referring again to FIG. 1, in the architecture depicted in FIG. 1, the active sources 102 use a mesh-based data aggregation peer-to-peer protocol, while the relay/receivers 104 use a tree-based video multicast protocol. It should be understood that embodiments in accordance with the present invention are well suited to using various other protocols and combinations of protocols for active sources 102 and for relay/receivers 104.

Referring still to FIG. 1 and also to 206 of FIG. 2, embodiments in accordance with the present invention utilize the first portion (i.e., active sources 102) of the peer-to-peer network to generate an aggregated media stream, wherein the aggregated media stream is comprised of a plurality of media streams. More specifically, in embodiments in accordance with the present invention, each active source (e.g., peers 102a, 102b, 102c, 102d, and 102e) which produces content, is responsible for aggregating all other content with its own. In one embodiment, such aggregation is accomplished using a mesh-based data aggregation peer-to-peer protocol. In one embodiment, the content is, for example, a video stream and the corresponding audio stream generated by an attendee to a video teleconference. Although a media stream is specifically mentioned above, it should be appreciated that embodiments in accordance with the present invention are well suited to use with any of a myriad of content types which could be generated by any member or members of active sources 102. By having members of active sources 102 aggregate the media stream, embodiments in accordance with the present invention create several versions of a "super-stream", which can be transmitted as a unique stream to the rest of the active sources. Additionally, by limiting the active sources to only those peers who generate content, are sufficiently constraint burdened, or who opt to be included as an active source, embodiments in accordance with the present invention drastically limit the number of hops a packet needs to go through before reaching any of the peers. As a result, embodiments in accordance with present invention limit the delay required transmit content through the peer-to-peer network (e.g., the first portion of the peer-to-peer network).

Embodiments in accordance with the present invention enable members of the peer-to-peer network to change their membership between being a member of said first portion of said peer-to-peer network (e.g., active sources 102) and being a member of the second portion of said peer-to-peer network (e.g., relay/receivers 104). That is, embodiments in accordance with the present invention enable having a member change from being a member of the first portion of the peer-to-peer network to being a member of the second portion of the peer-to-peer network. Similarly, embodiments in accordance with the present invention enable having a member change from being a member of the second portion of the peer-to-peer network to being a member of the first portion of the peer-to-peer network.

Figure 3:
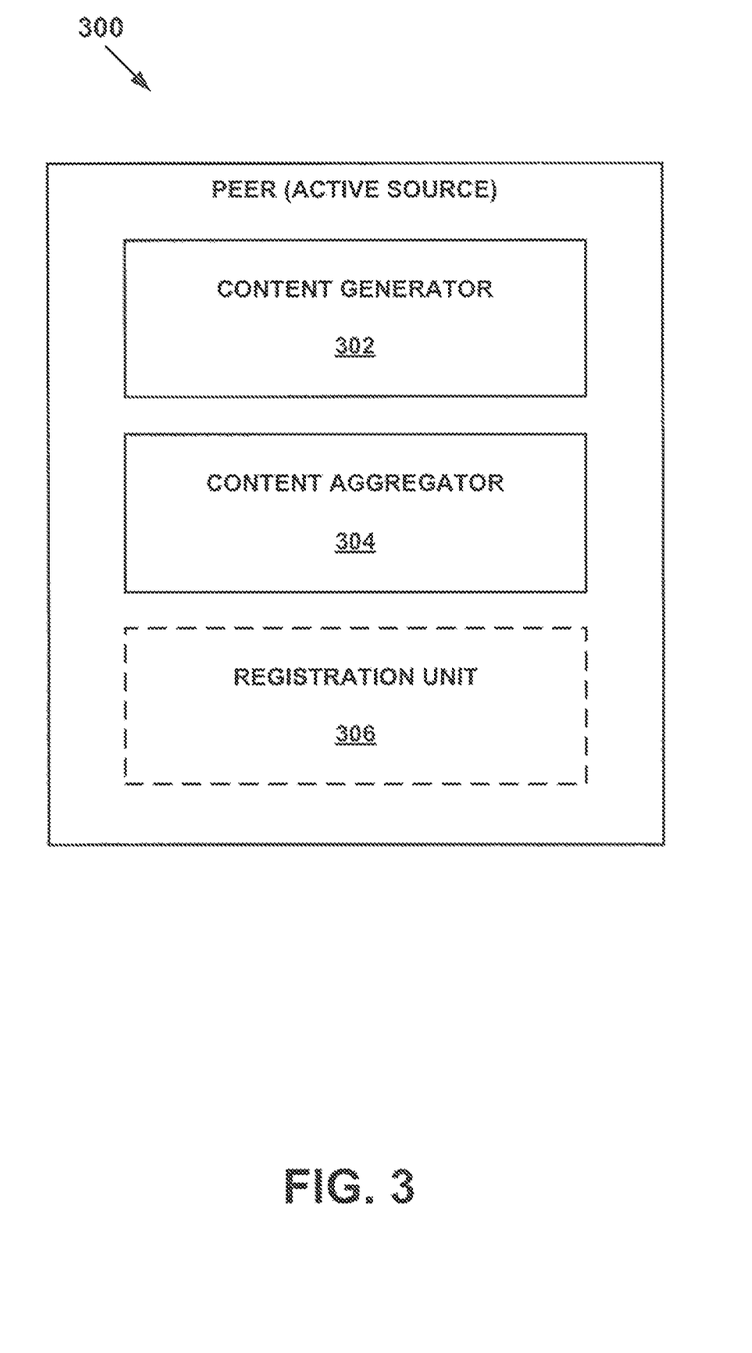
FIG. 3 is a schematic block diagram of a peer for use in the present peer-to-peer media streaming technology in accordance with one embodiment of the present invention.

With reference now to FIG. 3, a schematic block diagram 300 of a peer (active source) for use in the present peer-to-peer media streaming technology in accordance with one embodiment of the present invention. As shown in FIG. 3, the peer includes a content generator 302 for generating content of the type described above. Additionally, the peer includes a content aggregator 304 for aggregating the content generated by the peer with content generated by other peers in the manner as was described above. The peer of FIG. 3 is also shown to include an optional registration unit 306. As will be described in detail below, registration unit 306 performs the functionality typically performed by a separate and distinct registration server. In embodiments in accordance with the present invention, block diagram 300 may also include a feature, not shown, for providing content distribution and which establishes a bridge between active sources 102 and relay/receivers 104.

Referring still to 206 of FIG. 2 and also to FIG. 1, in one embodiment in accordance with the present invention, the aggregation, by active sources 102, of the generated content is accomplished as follows. A list of all active sources is obtained. The present embodiment then synchronizes time with the other active sources. The active sources then exchange maps of recently produced or received content with all the other sources. This exchange of maps of recently produced or received content is performed, for example, periodically. In an embodiment in which the content is comprised of packetized content, the exchanged maps list packet numbers and identify the origin of each packet (i.e., the active source which produced the content packet). In the present embodiment, a scheduling algorithm is then used to periodically request missing content from other active sources.

Referring now to 208 of FIG. 2, embodiments in accordance with the present invention then deliver the aggregated media stream from the first portion of the peer-to-peer network (i.e., active sources 102) to the second portion of the peer-to-peer network (i.e., relay/receivers 104). More specifically, in FIG. 1, the bi-directional arrows, typically shown as 107, denote packet exchanges between the active sources (e.g., peers 102*a*, 102*b*, 102*c*, 102*d*, and 102*e*). Referring again to 208 of FIG. 2, in embodiments in accordance with the present invention, the aggregated media stream is transmitted to the relay/receivers 104 (e.g., 104*a*, 104*b*, 104*c*, and 104*d*) via a tree-based peer-to-peer video multicast protocol. Such a tree is depicted in FIG. 1. In this embodiment, the roots of the application layer multicast tree are selected from the active sources (102*c*, 102*d*, and 102*e*) which aggregate the media stream as described above.

It will be understood that various other protocols allow peers in a peer-to-peer network to self-organize in a mesh or in application multicast trees to obtain different portions of a content produced from a single source, from other connected peers, with moderate latency. However, unlike conventional approaches, embodiments in accordance with the present invention enable multiple active sources (e.g., peers 102*a*, 102*b*, 102*c*, 102*d*, and 102*e*) to be active at the same time in the same peer-to-peer network. Additionally, in embodiments in accordance with the present invention, only one control plane is used, information about content produced by different active sources is transmitted in the same session, and scheduling decisions are made jointly for all the active media streams. As a result, embodiments in accordance with the present invention are particularly useful to avoid congestion and prevent different media streams from competing for the use of the peer-to-peer network resources. As a result, embodiments in accordance with the present invention enable coordination across media streams.

Referring still to FIG. 1 and also to 208 of FIG. 2, in embodiments in accordance with the present invention, the content multicast from active sources 102 to and through relay/receivers 104 is driven by several distributed active sources (e.g., peers 102*c*, 102*d*, and 102*e*) which all obtain a copy of the content (e.g., a media stream) or of part of the content in a distributed fashion. It should be noted that in embodiments in accordance with the present invention, any single active source, any combination of multiple active sources (as depicted in the embodiment of FIG. 1), or even all of the active sources, can be used to drive the peer-to-peer video multicast. Furthermore, in embodiments in which more that one active source is used to drive the multicast, the more than one active sources are not required to each have an exact replica of the content (e.g., a media stream). Also, when the content is comprised of a media stream, the packets comprising the stream may be transmitted from the active sources in a different order.

Registration server 106 is responsible for maintaining a list of active sources 102. In addition registration server 106 maintains an approximate list of receiver/relay peers 104 connected to the peer-to-peer network 100. When a new peer wants to join the session, the new peer sends a request to registration server 106 indicating whether or not it is an active source. If the new peer is an active source, it will receive, as a response, information allowing the new peer to connect to the other active sources 102 as a member of the active sources 102. If the new peer is not an active source, it will receive, as a response, information allowing it to connect to relay/receivers 104. Registration server 106 also assists peers, in a similar fashion, when they transition between being a member of active sources 102 and relay/receivers 104. An example of a peer transitioning from one portion of the peer-to-peer network to another is a speaker (typically an active source peer) going silent for a long period of time (typically a relay/receiver peer). Another example of a peer transitioning from one portion of the peer-to-peer network to another is a member of the audience (typically a relay/receiver peer) joining the discussion (typically an active source peer).

Although registration server 106 is shown as a separate and distinct device in FIG. 1, other embodiments in accordance with the present invention incorporate the functionality of registration server 106 into one or more members of the peer-to-peer network. For example, embodiments in accordance with the present invention incorporate the functionality of server 106 into any member or members of active sources 102 (e.g., peers 102*a*, 102*b*, 102*c*, 102*d*, and 102*e*) and/or any member or members of relay/receivers 104 (e.g., peers 104*a*, 104*b*, 104*e*, and 104*d*). By incorporating the functionality of registration server 106 into members of the peer-to-peer network, embodiments in accordance with the present invention further reduce the infrastructure associated with the peer-to-peer network configuration 100 for media streaming.

Several significant advantages are achieved by the embodiment of the present invention. Specifically, embodiments in accordance with the present invention accommodate the different quality of service requirements of the peers. Hence, content generating or constraint burdened peers are defined to active sources and, as a result, do not suffer from unacceptable delay issues. Additionally, the architecture employed in accordance with embodiments of the present invention are able to operate effectively with the complexity of having a large set of peers aggregate multiple media streams in real time and on the challenging constraints of, for example, a teleconference communication scenario. In such a scenario, the active sources (e.g., the teleconference speakers) are conversing, and the delay between them needs to be kept extremely low. In order to comply with the time constraints associated with a teleconference communication scenario, ideally, the time between which a packet has been produced and the time it is played out by the other active sources should not exceed a few hundreds of milliseconds. Listeners of the teleconference (relay/receivers) can tolerate a higher delay, on the order of a few seconds, as long as the media streams originating from the different speakers remain synchronized. Until the above-described embodiments in accordance with the present invention, such unique requirements have precluded the use of other conventional peer-to-peer video streaming distribution mechanisms. Such conventional peer-to-peer video streaming distribution mechanisms treat all peers equally and no peer is guaranteed lower delay over the others.

The implementation we described differentiates between two groups of users. Following the same line of thought, N groups (N>=2) could be supported, with N P2P networks and potentially N different protocols. It is beneficial to give priority to the data transmission between active sources over the data transmission to the audience. This would result, for example, in forwarding data in priority to peers of the first tier, reserving some throughput for peers of the first tier, using different amounts of error correction for data in the first tier, etc. The registration server can be collocated with one of the active sources. Peers which are not sources could belong to the first tier P2P network.

Hence, embodiments in accordance with the present invention enable low cost deployment of applications which today require a costly infrastructure. That is, embodiments in accordance with the present do not require any additional infrastructure other than the infrastructure conventionally associated with a peer-to-peer network. Moreover, embodiments in accordance with the present invention simplify greatly the problem of having a large audience aggregate many data sources in real-time. Instead, in the various embodiments in accordance with the present invention, the aggregation is left to a small subset of peers (i.e., active sources 102 of FIG. 1) and is transparent to the rest of the members (i.e., relay/receivers 104). Also embodiments in accordance with the present invention allow sharing in real-time of K distributed media streams to a large set of users, using only one control plane. Such an approach is much more efficient than using K independent multicast sessions, and such an approach avoids competition among the sources for the peer-to-peer network resources. Furthermore, the multi-tier distribution enables different quality of service requirement for different sets of peers. Hence, embodiments in accordance with the present invention enable, for example, a conversational application for the speakers, and a moderate delay application for the audience. Additionally, the various embodiments in accordance with the present invention are well suited to many other scenarios than the above-described teleconference communication scenario. Such scenarios include, but are not limited to, one source broadcasting video to a population of other peers (akin to a peer-to-peer video multicast system), and several peers conversing (many-to-many video conferencing).

Unless specifically stated otherwise as apparent from the following discussions, it is appreciated that throughout the present detailed description, discussions utilizing terms such as "defining", "utilizing", and "delivering" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for peer-to-peer media streaming is also well suited to the use of other computer systems such as, for example, optical and mechanical computers. Additionally, it should be understood that in embodiments of the present technology for peer-to-peer media streaming, one or more of the steps can be performed manually.

Example Computer System Environment

Figure 4:
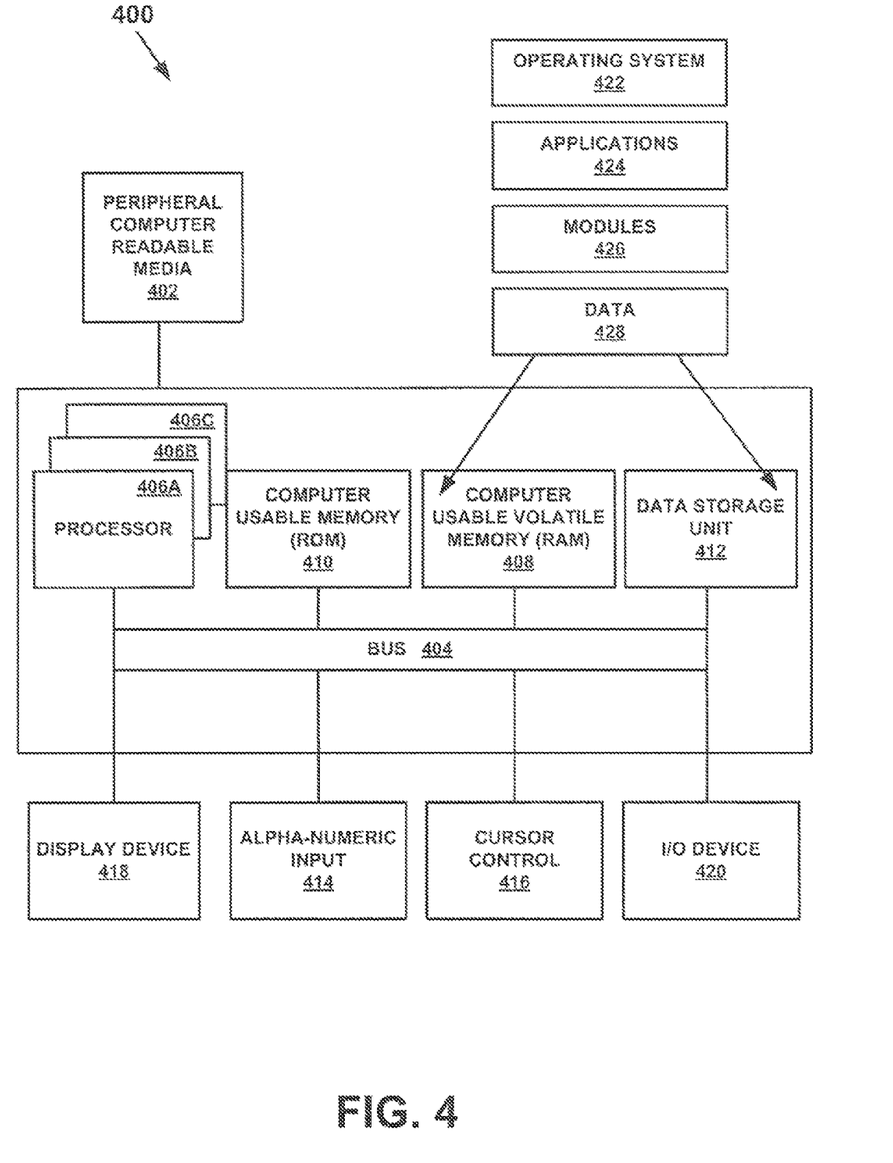
FIG. 4 is a schematic diagram of a computer system on which embodiments in accordance with the present invention may be employed.

With reference now to FIG. 4, portions of the technology for peer-to-peer media streaming are composed of computer-readable and computer-executable instructions that reside, for example, in computer-usable media of a computer system. That is, FIG. 4 illustrates one example of a type of computer that can be used to implement embodiments, which are discussed above, of the present peer-to-peer media streaming technology. More specifically, the features of FIG. 4 would comprise a peer such as, for example, any member or members of active sources 102 (e.g., peers 102a, 102b, 102c, 102d, and 102e) and/or any member or members of relay/receivers 104 (e.g., peers 104a, 104b, 104c, and 104d). FIG. 4 illustrates an exemplary computer system 400 used in accordance with embodiments of the present technology for peer-to-peer media streaming. It is appreciated that system 400 of FIG. 4 is exemplary only and that the present technology for peer-to-peer media streaming can operate on or within a number of different computer systems including general purpose networked computer systems, embedded computer systems, routers, switches, server devices, client devices, various intermediate devices/nodes, stand alone computer systems, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C. System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4, may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. In one embodiment, the present technology for peer-to-peer media streaming, for example, is stored as an application 424 or module 426 in memory locations within RAM 408 and memory areas within data storage unit 412.

While the present invention has been described in particular embodiments, it should be appreciated that the present invention should not be construed as limited by such embodiments, but rather construed according to the following claims.

What is claimed is:

1. A method for multi-way peer-to-peer media streaming, said method comprising:
 defining a first portion of a peer-to-peer network;
 defining a second portion of said peer-to-peer network;
 utilizing said first portion of said peer-to-peer network to generate an aggregated media stream, wherein said aggregated media stream is comprised of a plurality of media streams; and
 delivering said aggregated media stream from said first portion of said peer-to-peer network to said second portion of said peer-to-peer network.

2. The method as recited by claim 1 wherein said defining a first portion of said peer-to-peer network comprises:
 defining content-generating peers as members of said first portion of said peer-to-peer network.

3. The method as recited by claim 1 wherein said defining a first portion of said peer-to-peer network comprises:
 defining constraint-burdened peers as members of said first portion of said peer-to-peer network.

4. The method as recited in claim 1 wherein said defining a second portion of said peer-to-peer network comprises:
 defining peers which do not generate content as members of said second portion of said peer-to-peer network.

5. The method as recited in claim 1 wherein said method for peer-to-peer streaming does not require any additional infrastructure other than the infrastructure associated with said peer-to-peer network.

6. The method as recited in claim 1 further comprising:
 utilizing a registration server to maintain a list which identifies those peers comprising said first portion of said peer-to-peer network and which identifies those peers comprising said second portion of said peer-to-peer network.

7. The method as recited in claim 1 further comprising:
 utilizing said first portion of said peer-to-peer network to deliver said aggregated media stream between said peers of said first portion of said peer-to-peer network at near real time.

8. The method as recited in claim 1 further comprising:
 enabling members of said peer-to-peer network to change their membership between being a member of said first portion of said peer-to-peer network and being a member of said second portion of said peer-to-peer network.

9. A method for multi-way media streaming using a hierarchically defined peer-to-peer network, said method comprising:
 hierarchically defining a peer-to-peer network such that a first portion of said peer-to-peer network is defined and a second portion of said peer-to-peer network is defined;
 utilizing said first portion of said peer-to-peer network to generate an aggregated media stream, wherein said aggregated media stream is comprised of a plurality of media streams; and
 delivering said aggregated media stream from said first portion of said peer-to-peer network to said second portion of said peer-to-peer network such that multi-way communication is enabled between peers of said first portion of said peer-to-peer network and peers of said second portion of said peer-to-peer network.

10. The method as recited in claim 9 wherein said hierarchically defining a peer-to-peer network comprises:
 defining content-generating peers as members of said first portion of said peer-to-peer network.

11. The method as recited in claim 9 wherein said hierarchically defining a peer-to-peer network comprises:
 defining constraint-burdened peers as members of said first portion of said peer-to-peer network.

12. The method as recited in claim 9 wherein said hierarchically defining a peer-to-peer network comprises:
 defining peers which do not generate content as members of said second portion of said peer-to-peer network.

13. The method as recited in claim 9 wherein said method for multi-way media streaming using a hierarchically defined peer-to-peer network does not require any additional infrastructure other than the infrastructure associated with said peer-to-peer network.

14. The method as recited in claim 9 further comprising:
 utilizing a registration server to maintain a list which identifies those peers comprising said first portion of said peer-to-peer network and which identifies those peers comprising said second portion of said peer-to-peer network.

15. The method as recited in claim 9 further comprising:
 enabling members of said peer-to-peer network to change their membership between being a member of said first portion of said peer-to-peer network and being a member of said second portion of said peer-to-peer network.

16. A computer-readable memory have computer-readable code stored thereon for causing a processor to perform a method for multi-way peer-to-peer media streaming, said method comprising:
 defining a first portion of a peer-to-peer network;
 defining a second portion of said peer-to-peer network;

utilizing said first portion of said peer-to-peer network to generate an aggregated media stream, wherein said aggregated media stream is comprised of a plurality of media streams; and delivering said aggregated media stream from said first portion of said peer-to-peer network to said second portion of said peer-to-peer network.

17. The computer-readable memory claim 16 wherein said computer-readable code stored thereon further causes said processor to define said first portion of said peer-to-peer network by defining content-generating peers as members of said first portion of said peer-to-peer network.

18. The computer-readable memory of claim 16 wherein said computer-readable code stored thereon further causes said processor to define said first portion of said peer-to-peer network by defining constraint-burdened peers as members of said first portion of said peer-to-peer network.

19. The computer-readable memory of claim 16 wherein said computer-readable code stored thereon further causes said processor to define said second portion of said peer-to-peer network by defining peers which do not generate content as members of said second portion of said peer-to-peer network.

20. The computer-readable memory of claim 16 wherein said method for peer-to-peer streaming does not require any additional infrastructure other than the infrastructure associated with said peer-to-peer network.

21. The computer-readable memory of claim 16 wherein said computer-readable code stored thereon further causes said processor to utilize a registration server to maintain a list which identifies those peers comprising said first portion of said peer-to-peer network and which identifies those peers comprising said second portion of said peer-to-peer network.

22. The computer-readable memory of claim 16 wherein said computer-readable code stored thereon further causes said processor to define said first portion of said peer-to-peer network by utilizing said first portion of said peer-to-peer network to deliver said aggregated media stream between said peers of said first portion of said peer-to-peer network at near real time.

23. The computer-readable memory of claim 16 wherein said computer-readable code stored thereon further causes said processor to enable members of said peer-to-peer network to change their membership between being a member of said first portion of said peer-to-peer network and being a member of said second portion of said peer-to-peer network.

* * * * *

UNITED STATES PATENT AND TRADEMARK OFFICE
CERTIFICATE OF CORRECTION

PATENT NO. : 9,462,018 B2  
APPLICATION NO. : 12/812170  
DATED : October 4, 2016  
INVENTOR(S) : Setton et al.

Page 1 of 1

It is certified that error appears in the above-identified patent and that said Letters Patent is hereby corrected as shown below:

In the Claims

In Column 11, Line 8, in Claim 17, delete "memory claim" and insert -- memory of claim --, therefor.

Signed and Sealed this  
Twenty-eighth Day of February, 2017

Michelle K. Lee  
*Director of the United States Patent and Trademark Office*